United States Patent

Lemanski

[15] 3,654,827
[45] Apr. 11, 1972

[54] TOOL HOLDER AND ATTACHMENTS FOR A LATHE

[72] Inventor: Savarian F. Lemanski, 109 Taylor Street, Detroit, Mich. 48202

[22] Filed: Sept. 15, 1970

[21] Appl. No.: 72,525

Related U.S. Application Data

[62] Division of Ser. No. 732,995, May 29, 1968, abandoned.

[52] U.S. Cl. .................................................... 82/25, 29/97
[51] Int. Cl. ........................................................ B23b 21/00
[58] Field of Search ........................... 82/25, 36, 37; 29/97

[56] References Cited

UNITED STATES PATENTS 1,951,488   3/1934   Newton ............................... 82/25 X
1,419,967   6/1922   Henning ................................. 29/97

Primary Examiner—Leonidas Vlachos
Attorney—Hauke, Gifford and Patalidis

[57] ABSTRACT

A lathe tool holder having an elongated body for supporting a tool in which the cutting ends of the tool extend from both ends of the body. A laterally extending arm joined to the body and adapted for mounting in the tool post of the lathe allows the holder to be mounted in two positions with the tool off-center from the tool post. In one position the cutting end of the tool extending from one end of the body is in a cutting position, and in its reversed position, the cutting edges at the other end of the body are in a cutting position. Adjustable feet under the tool holder provide means for precisely adjusting the height of the tool above the compound rest without shims. A pivotal arm on the body carries a second, finishing tool that can be mounted on a rough finish tool in the body; and a locator attachment on the tool holder provides means for locating the cutting tools for cutting a series of regularly spaced grooves in a workpiece.

7 Claims, 10 Drawing Figures

PATENTED APR 11 1972
3,654,827
SHEET 1 OF 2
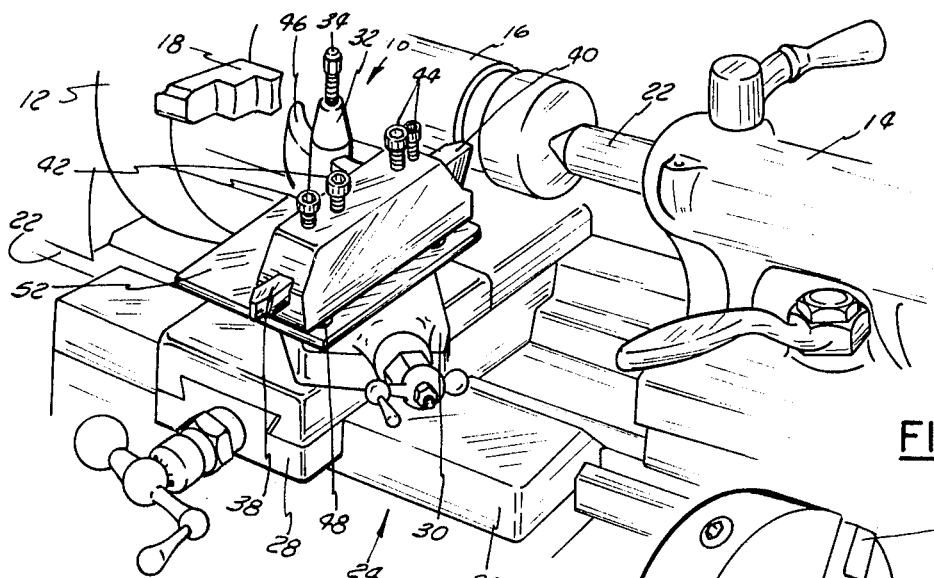
FIG. 1
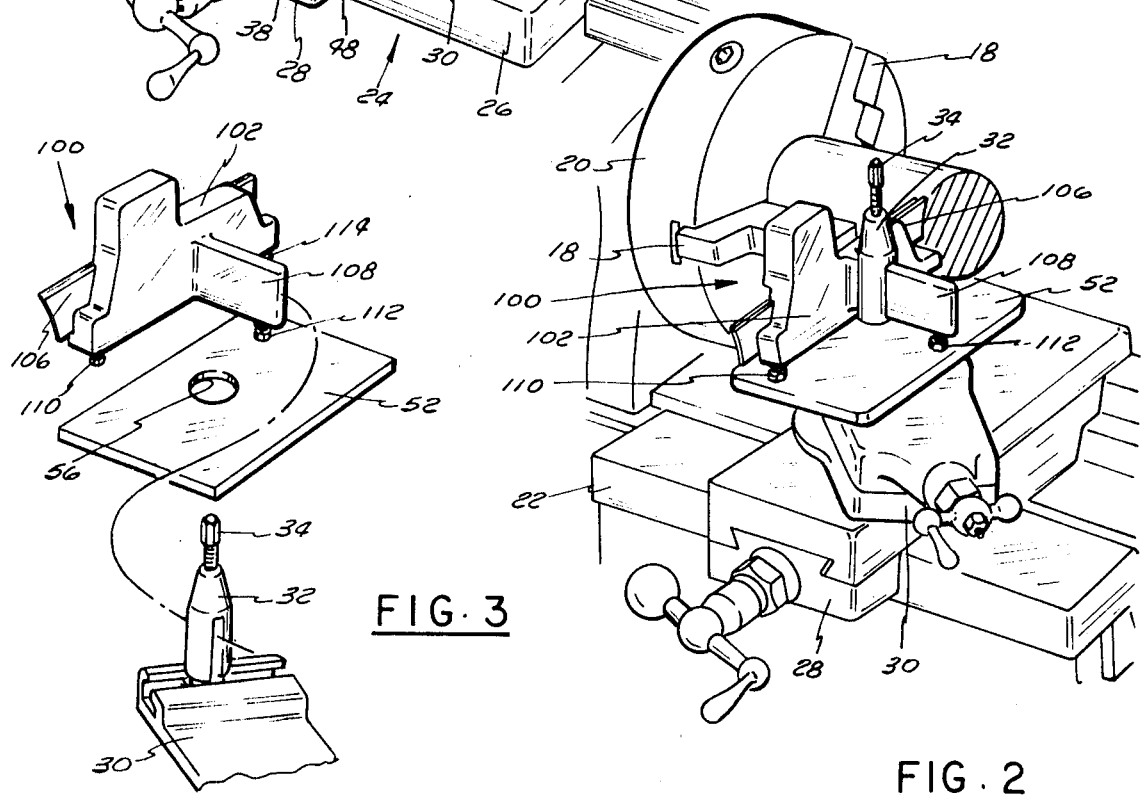
FIG. 3
FIG. 2
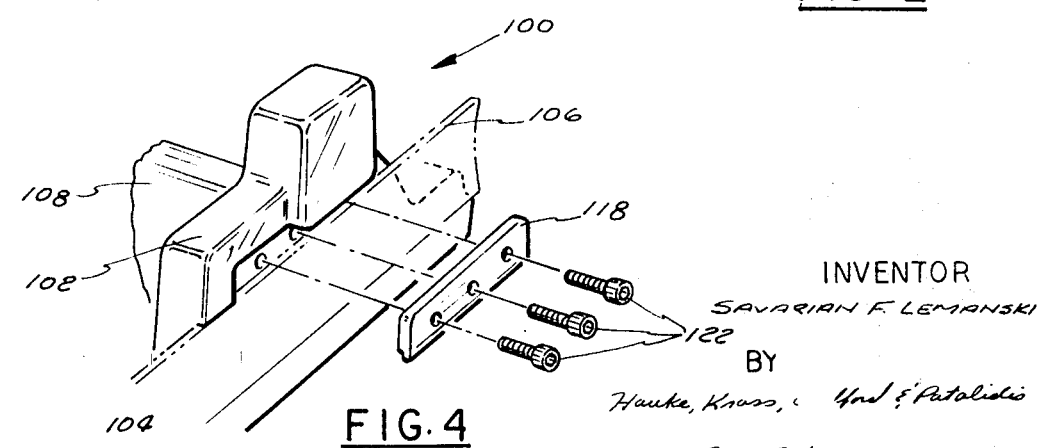
FIG. 4
INVENTOR
SAVARIAN F. LEMANSKI
BY
Hauke, Kness, Yord & Patalidis
ATTORNEYS INVENTOR
SAVARIAN F. LEMANSKI
BY
Hauke, Knaus, Gifford
& Patalidis
ATTORNEYS

TOOL HOLDER AND ATTACHMENTS FOR A LATHE

This application is a division of Ser. No. 732,995, filed May 29, 1968, now abandoned.

BACKGROUND OF THE INVENTION

The invention relates to lathes, and more particularly to an improved tool holder for lathes adapted for supporting a tool for closely cutting a workpiece with respect to either the headstock or the tailstock of the lathe with means for mounting a second, finishing tool which swings into position onto a rough finish tool supported in the holder; and a locator attachment adapted to swing in and out of position to provide means for positioning the cutting tools for forming a series of regularly spaced grooves in a workpiece.

Conventional tool holders for lathes are mounted in a tool post with the tool bit extending toward the workpiece. For straight turning, the operator may use one of three types of holders; a straight tool holder, a right-hand tool holder, or a left-hand tool holder, depending on the direction in which the tool is being fed with respect to the centerline of the lathe, that is, either toward the headstock or toward the tailstock. In order to change the direction of travel of the tool, a tool having a different set of cutting edges in a different holder must be mounted in the tool post. The tool post is usually mounted on a compound rest with the height of the tool bit with respect to the rest being varied by mounting a series of shims in the tool post to either raise or lower the holder.

In addition, conventional tool holders make it extremely difficult to machine a workpiece close to either the headstock or the tailstock without interference between the work clamping chuck and the compound rest. When the tool is mounted in such tool holders, its cutting end often has a substantial overhang or unsupported length so that it is difficult to eliminate chatter which damages the tool and the workpiece.

Another problem associated with conventional tool holders are the tool changes necessary when the workpiece must initially be finished with a rough finishing tool and then with a fine finishing tool. For instance, the operator may desire to cut a groove in a workpiece with one tool and then to chamfer the shoulders of the groove with a chamfering tool. This requires that he initially mount a first tool in the tool post, perform the cut, and then mount a finishing tool to perform the chamfer.

Still another problem that arises with conventional tool holders occurs where the operator desires to cut a series of grooves at regularly spaced, precise, intervals in a workpiece. Conventional practice is to cut an initial or reference groove in the workpiece, and by using a scale, reposition the tool at a precise distance from the reference cut to perform the second cut, perform the second cut and then repeat the scaling step with each successive cut. This is a time consuming method if the grooves or cuts in the workpiece are to be accurately located.

The broad purpose of the present invention is to provide a tool holder for lathes that allows the operator to perform a variety of different cutting operations without remounting the holder and which assists the operator in positioning the tool for more precise and accurate cutting operations.

SUMMARY

The preferred embodiment of the present invention comprises a tool holder having an elongated body section in which a pair of cutting tools can be mounted, one adjacent each end so that their cutting ends generally point in opposite directions. In another embodiment, the side of the tool holder is provided with a tool mounting slot that extends from one end to the other end. A single, elongated tool is mounted and clamped in the slot and has a sufficient length so that cutting edges on both of its ends extend beyond the ends of the tool holder body in opposite directions.

Each embodiment has an integral, lateral arm extending from approximately the mid-section of the body. The lateral arm is relatively flat so that it can be mounted in a conventional tool post and engaged by the clamping screw which abuts the upper surface of the arm.

Three adjustable feet are threadably mounted on the bottom of the preferred tool holder, one adjacent each end of the body below the mounted position of the cutting tool and the third adjacent the end of the arm. Preferably the tool holder is mounted on a flat plate which has a central hole for receiving the tool post so that it is supported by the compound rest to provide a flat surface on which the three feet of the tool holder can rest. In order to mount the tool holder in a cutting position, the height of the cutting edges of the tool with respect to the compound rest are adjusted by adjusting the length of each of the adjustable feet. The clamping screw is then tightened against the upper surface of the lateral arm so that the holder is rigidly clamped in position. The adjustable feet eliminate the necessity for the conventional shims employed to vary the height of the conventional tool holders. In addition, the location of the feet below the cutting tool is such that they provide support for the tool during the cutting operation, thereby eliminating chatter, insuring an improved finish on the workpiece and prolonging the life of the tool.

The lateral arm of the preferred holder, permits the tool to be mounted in either of two positions. In one position, the body of the tool holder is supported between the tool post and the headstock of the lathe which allows the tool to cut the workpiece relatively close to the headstock without interference with the workholding chucks. When the tool holder is reversed substantially 180° so that the holder is supported between the tool post and the tailstock, the cutting edges extending from the opposite end of the holder are engageable with the workpiece. In this position, the cutting tool can engage the workpiece relatively close to the tailstock without interference between the tailstock and the compound rest. By employing different tools on each end of the holder, the operator can quickly rotate the tool post to bring one or the other of the tools into a cutting position, thereby eliminating the necessity for changing tool holders as is the case where the operator is employing conventional right-handed or left-handed holders, depending on the direction the tool bit is being fed.

In another embodiment of the invention, the tool holder has an arm with one end joined to approximately the midsection of the body of the tool holder which curves toward one of the longitudinal ends of the body. This configuration also allows the holder to be mounted in such a manner that the tool can be fed in close to the chuck without interference between the rotating components of the lathe and the compound rest.

Another feature of the present invention resides in the manner in which the tool is clamped in the holder. In the embodiment in which the tool extends the full length of the body of the holder, the tool is mounted in an elongated slot which extends between the opposite longitudinal ends of the body. The body has a cam surface adjacent the upper side of the slot and facing its lower side.

A clamping member is mounted on the body with its upper edge engaging the cam surface and its lower edge engages the upper edge of the tool. A series of screws connecting the clamping member to the body are arranged so that as the screws are tightened, the clamping member is cammed by the cam surface toward the lower side of the slot thereby tightly clamping the tool to the holder. This arrangement allows the operator to quickly remove and insert a tool, and, in addition allows him to firmly clamp the tool to the holder.

In another embodiment of the invention, the tool holder has means for supporting a second tool for a finishing operation. In this form of the invention, a pivot arm, having one end pivotally connected to the body of the tool holder has means on its outer end for supporting the second tool. An arm is mounted so that the second tool which may be employed for a finishing or chamfering operation can be swung between a rearward position allowing the rough finish tool mounted on the body of the holder to engage the workpiece, and a forward position in which the second tool is mounted in a cutting position on the upper edge of the rough finish tool so that it is both supported and located by the rough finish tool.

This dual cutting tool arrangement allows the operator to perform a rough cut, such as cutting a groove in a workpiece, and then without replacing the holder or removing its setting in the tool post, swing the chamfering tool forward into position to remove the rough edges from the shoulders of the groove.

The preferred tool also has a tool-locating feature that allows the tool to be moved between a series of precisely located cutting positions parallel to the centerline of the lathe in order to form a series of regularly spaced cuts in the workpiece such as the grooves. This locating feature relieves the operator of having to accurately scale the distance between each pair of neighboring grooves. The locating means includes a locating arm which extends at right angles to the body of the tool holder adjacent one of its longitudinal ends and is connected in such a manner that it can be swung to an inactive position adjacent the opposite end of the holder.

A locating member is slidably mounted on the locating arm such that it can be locked at a selected distance from the cutting end of the tool mounted in the body of the holder. A locating arm is pivotal about its longitudinal axis so that the locating element can be raised to allow the tool to be fed into the workpiece to cut a groove and the like, and then lowered to a position where it is received by the groove.

In operation, the operator cuts a series of grooves by initially feeding the cutting tool into the workpiece to cut a reference groove, and then moving the in-feed carriage parallel to the workpiece until the locating element can be received in the reference groove. The cutting tool is then in position for cutting the second groove. The locating element is then raised, and the second groove cut by feeding the cutting tool in the usual manner. This operation is repeated until the necessary number of grooves have been formed.

Still other advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views in which:

FIG. 1 is a perspective view showing a preferred tool holder having a pair of tool bits mounted on each end of the body of the holder with one of the tool bits disposed in a cutting position;

FIG. 2 is a view showing another tool holder illustrating an embodiment of the invention with a straight lateral arm engaged in the tool post and a single cutting tool mounted in the holder with its ends extending beyond the ends of the body.

FIG. 3 is a partially exploded view of the tool holder of FIG. 2;

FIG. 4 is an enlarged fragmentary view showing the components of the means for clamping the tool shown in an exploded relationship;

DESCRIPTION OF THE PREFERRED EMBODIMENT

Figures 6, 7:
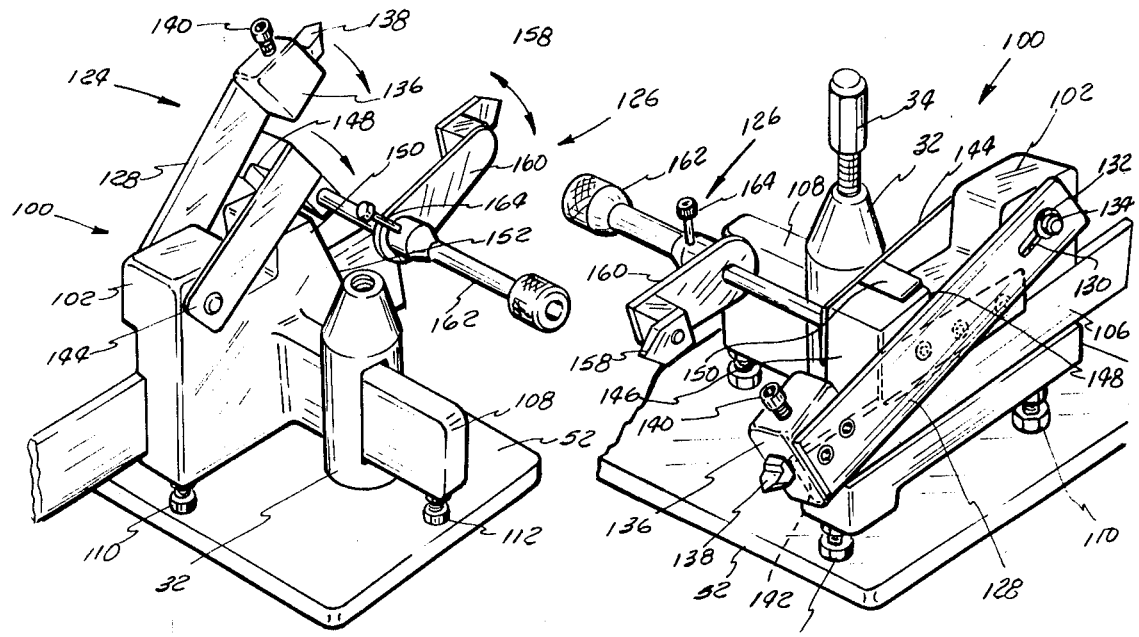
FIG. 6 is a view of a tool holder illustrating still another embodiment of the invention and supporting a chamfering tool and a locating means.
FIG. 7 is another view of the tool holder in FIG. 6 from the opposite side with the chamfering tool lowered in its cutting position.

The preferred tool holder generally indicated at 10 is mounted in a conventional lathe having a headstock 12 and a tailstock 14 adapted to rotate a workpiece 16 between centers. One end of the workpiece 16 is clamped in a set of chucks 18 mounted in a conventional manner on a rotatable face plate 20 carried by the headstock and the opposite end of the workpiece is mounted in a center 22 carried by the tailstock. The headstock 12 and the tailstock 14 are mounted on a bed 22 with the tailstock being supported on ways for motion toward and away from the headstock.

A lathe carriage generally indicated at 24 is mounted on the bed of the lathe and includes the usual apron 26, an in-feed attachment 28 which is carried on the apron and a compound rest 30 which is mounted on the in-feed attachment. A tool post 32 mounted on the compound rest carries a clamping screw 34 for rigidly mounting the tool holder 10 in position. The apron is connected with suitable drive means (not shown) such as a threaded screw so that it can be advanced parallel to the centerline of the lathe. The in-feed attachment 28 provides means for advancing a tool carried in the tool holder 10 in a direction transverse to the axis of rotation of the workpiece. The compound rest 30 provides means for rotating the tool to a selected feed angle with respect to the axis of rotation of the workpiece 16.

The tool holder 10 comprises an elongated body member 36 having sockets formed in each of its longitudinal ends for receiving a pair of cutting tools 38 and 40 which extend in opposite directions with respect to the body 36. A pair of clamping screws 42 mounted on the body are adapted to rigidly clamp the cutting tool 38 so that its cutting end projects beyond the end of the body 36. Similarly, a pair of clamping screws 44 are mounted on the body to clamp the cutting tool 40 so that its cutting end extends beyond the end of the body 36.

A lateral arm 46 having one end integrally joined to the body 36 approximately midway between its longitudinal ends is curved toward its outer end in a direction toward one of the longitudinal ends of the body. The arm 46 is relatively thin so that it can be received in the tool mounting slot of the tool post 32 and its upper edge engaged by the lower end of the clamping screw 34.

Three adjustable mounting feet 48, 50 and 52 are threadably mounted on the bottom of the tool holder with the feet 48 and 50 being mounted substantially directly below the tools 38 and 40 and the third foot 52 being mounted adjacent the outer end of the lateral arm 46. The adjustable feet 48 and 52 provide means for supporting the tools 38 and 40 at a selected height above the compound rest 30 in order to accommodate the workpiece 16. Each post is locked in position by a lock nut.

A flat mounting plate or pad 54 having a center opening 56 through which the tool post 32 extends is disposed on the compound rest so that its upper surface provides a flat surface having an area sufficient to accommodate the position of the three mounting feet 48, 50 and 52.

In operation, the tool holder is illustrated in FIG. 1 for supporting the cutting tool 40 so that it can be fed closely adjacent the tailstock 14 of the lathe. The tool holder can be reversed to move the cutting tool 38 into a cutting position by rotating the tool post 32 so that the workpiece can be cut closely adjacent the workholding chucks 18 of the headstock of the lathe. By suitably shaping the cutting tools 38 and 40, the tool holder 10 can be employed for both right-hand and left-hand feeds without changing the setup of the machine. It can further be seen that the feet 48, 50 and 52 eliminate the necessity for the conventional shims that are mounted below the cutting tool in the slot of the tool post in order to vary the height of the cutting edges of the tool. Since the tools extend beyond the holder only a distance that exposes their cutting edges and with the holder being supported adjacent both ends, chatter that normally is associated with tool holders in which the tool is offset from the tool post with the holder having a substantial unsupported length separated from the tool post. This improved structure prolongs the life of the cutting tool and insures an improved finish on the workpiece.

Another tool holder, generally indicated at 100 is illustrated in FIGS. 2, 3, 4 and 5 and comprises an elongated body member 102 having a mounting slot 104 along one of its sides which extends between the opposite longitudinal ends of the body 102. In this embodiment of the invention, a single cutting tool 106, mounted in the slot 104, has cutting edges on both of its longitudinal ends and has a length such that both ends of the tool extend beyond the ends of the body 102. A straight, lateral arm 108 extends at right angles from the body 102 from approximately its mid-section and is adapted to be received in the mounting slot of the tool post 32. In this embodiment of the invention, the arm 108 is straight as opposed to the arm 46, in the embodiment of FIG. 1, which is curved between its inner and outer ends.

Three threadably mounted adjustable feet, 110, 112 and 114, are mounted on the bottom of the body 102 and the arm 108 to adjust the height of the cutting tool above the mounting plate 52 in a proper relationship with respect to the workpiece 16. In this version of the invention, the adjustable feet 110 and 114 are mounted substantially below the supported position of the tool 106 to support the portion of the holder extending from the tool post and to stabilize the cutting ends of the tool 106 when they are cutting the workpiece 16. The feet 110, 112 and 114 are also each locked in position by lock nuts.

Figure 5:
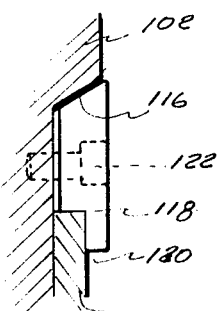
FIG. 5 is a transverse sectional view through the tool holder of FIG. 2 showing the manner in which the clamping member cams the tool into a locked position.

Referring to FIGS. 4 and 5, the body 102 of the tool holder has a cutout portion with a cam surface 116 adjacent its upper side facing the lower side of the slot. An elongated clamping member 118 is mounted between the cam surface 116 and the cutting tool 106 with a lip 120 overlapping the upper edge of the tool. The clamping member is connected to the body of the tool holder by three mounting screws 122. As the mounting screws 122 are tightened, the cam member 118 is cammed by the cam surface 116 downwardly toward the tool 106 so as to firmly clamp the tool between the clamping member 118 and the lower side of the slot 104. This clamping arrangement allows the operator to easily remove the tool for re-grinding or replacement by merely loosening the mounting screws 122, and to quickly clamp a new tool in position.

FIGS. 6 to 10 show the preferred tool holder 100 provided with a chamfering or finishing attachment 124 and a locating attachment 126. The chamfering attachment comprises an elongated arm 128 having a slot 130 formed adjacent its inner end and engaged by lock washer 132 and a threaded fastener 134 which connects the arm 128 to the body 102 of the tool holder. A member 136, carried at the outer end of the arm 128, has a socket for supporting a chamfering tool 138 or other suitable finishing tool which is clamped in the member 136 by a clamping screw 140.

The member 136 has a socket 142 on its lower side adapted to engage the outer end of the tool 106. The slot 130 on the inner end of the arm allows the operator to adjust the pivotal length of the arm 128 such that the member 136 seats on the upper edge of the tool 106 adjacent its outer edge so that the chamfering tool 138 is located as well as supported by the tool 106 in an overhang relationship.

The arm 128 allows the tool 138 to be swung rearwardly to an inactive position so as to allow the cutting tool 106 to perform a rough cut on the workpiece. The arm 128 can then be swung forwardly so that the member 136 is seated on the outer end of the tool 106 and the chamfering tool 138 is in its cutting position. Therefore the operator can perform two separate cutting operations on a workpiece without changing the cutting tools in the holder.

The locating attachment 126 comprises an arm 144 having its inner end pivotally attached to the body 102 of the holder and its outer end supporting a locating block 146 which has a lip 148 forming a slot for engaging a raised portion 150 of the body 102 which locates and firmly seats the arm 144 in its lowered position. The locating block has a cam surface which engages an outwardly sloping surface 152 of the raised portion 150 so that the arm is always firmly seated in its lowered position.

Figure 9:
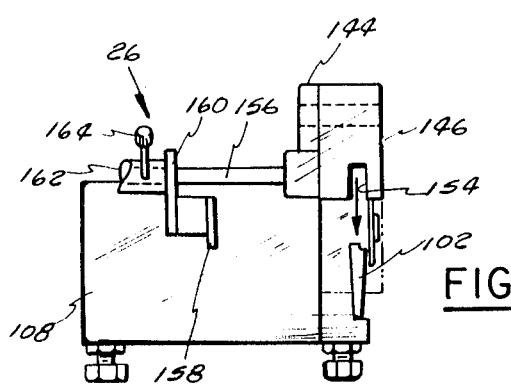
FIG. 9 is a fragmentary elevational view of the tool holder of FIG. 6 showing the manner in which the locating means is lowered in its locating position.

Referring to FIG. 9, the lower side of the block 146 has a slot 154 which slips over the upper edge of the tool 102.

A locating arm 156 is mounted on a block 146 so that it extends at right angles to the arm 144 and the tool 106 and is rotatable about its longitudinal axis. A locating element 158 carried on the end of a short arm 160 is fixedly attached to a tubular handle 162 which is longitudinally slidably mounted on the locating arm 156. A screw member 164 which engages a flat 166 formed on the arm allows the operator to lock the handle 162 on the locating arm so that the locating element 158 is rotatable with the arm 156 about the longitudinal axis of the locating arm 156.

In practice, the locating attachment is normally used by the operator to cut a series of precisely located regularly spaced grooves in a workpiece. The operator sets up the tool holder by spacing the locating element 158 at a precise distance with respect to the cutting tool 102. The locating element 158 is then locked in position. With the arm 160 raised, the operator cuts an initial groove 166 in workpiece 16. Upon completion of the groove 166 by the tool 106, the operator then retracts the tool holder until the tool 106 clears the groove 166 and then moves the carriage of the lathe parallel to the longitudinal axis of the workpiece 16 until he can lower the locating element 158 into the groove 166 by rotating the handle 162. When the locating element 158 can be received by the initial or reference groove in the workpiece, the operator then knows that the tool 106 is located for the second groove 168. He then rotates the locating element 158 about the axis of the locating arm 156 and feeds the cutting tool to perform the second groove in the workpiece. This procedure is repeated for each additional groove.

Figure 8:
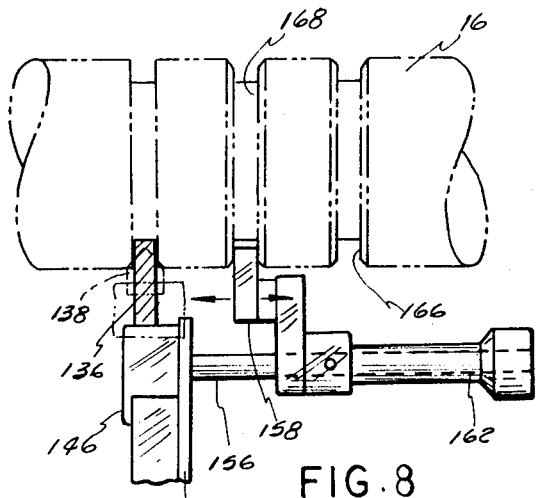
FIG. 8 is a view showing the manner in which the locating means is employed for cutting a series of finished grooves in a workpiece.
Figure 10:
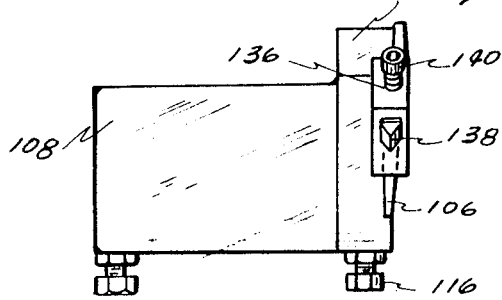
FIG. 10 is a fragmentary elevational view showing the manner in which the chamfering tool holding means is lowered in its cutting position.

The operator can employ the chamfering tool as shown in FIG. 8 to finish the corners of the grooves after each has been cut with the tool 106 and before advancing the tool holder to its next cutting position. As shown in FIG. 8, the chamfering tool has two cutting edges so that when it is fed into the work it chamfers both shoulders of the groove.

The locating means 126 is swingable rearwardly about the pivot axis of the arm 144 so that it does not interfere with the cutting operations when it is not employed for locating purposes. Similarly, the chamfering tool means can be swung rearwardly when it is not employed for a finishing operation.

It is to be understood that I have described in detail an improved tool holder for lathes which can be mounted in either left or right hand positions to position a pair of cutting tools for either a left hand or right hand feed for cutting close to either the headstock or the tailstock of the lathe. The preferred tool holder has adjustable feet which allows the cutting end of the tool to be precisely vertically positioned with respect to the workpiece. In addition, I have described means for mounting a second or finishing cutting tool such as a chamfering tool, on the tool holder to eliminate the necessity for the operator having to change cutting tools in order to perform a finish cut after a rough cut. Furthermore, I have described a novel locating means which enables the operator to quickly and accurately locate the cutting tool for cutting a series of regularly spaced grooves in a workpiece without the necessity for measuring the distance between adjacent grooves.

Although I have described several embodiments of my invention, it is to be understood that various changes and revisions can be made therein without departing from the spirit of the invention as expressed in the scope of the appended claims.

I claim:

1. Tool holder means for a lathe having a headstock, a tailstock spaced from the headstock, a compound rest supported between the headstock and the tailstock, a tool post with a slot mounted on the compound rest, and clamping means on the tool post, said tool holder means comprising a tool holder having an elongated body with first and second longitudinal ends, said body being adapted to support a cutting tool means so that the cutting edges of the cutting tool means extend beyond the longitudinal ends of the body, and an arm joined to the body between its longitudinal ends and extending laterally from the longitudinal axis of the body, said arm being receivable in the slot in the tool post for engagement with the clamping means so that the tool holder can be mounted in a first position on the compound rest in which the body is disposed with the cutting tool means extending from one of its longitudinal ends in a cutting position, or a second, reversed position in which the body is disposed with the cutting tool means extending from the opposite longitudinal end in a cutting position.

2. The invention as defined in claim 1, wherein the second means on the first end of the second arm are adapted to clamp the second arm to the first cutting tool with the cutting edges of the second cutting tool extending beyond the second arm and the first cutting tool.

3. The invention as defined in claim 1, wherein the means pivotally connecting the second arm comprise a slot adjacent a first end of the second arm extending parallel to its length and fastener means engaged in the slot for connecting the second arm to the body to vary the position the first end of the second arm extends beyond the end of the body to accommodate the length the first tool extends beyond the end of the body.

4. The invention as defined in claim 1, including a third, linear arm mounted on the tool holder and extending at right angles with respect to the body of the tool holder; a locator member mounted on the third arm for a first pivotal motion about the longitudinal axis of the third arm and a second, linear motion parallel to the longitudinal axis of the third arm toward and away from the body of the tool holder; and means for clamping said locator member on the third arm at a selected distance with respect to the supported position of the first tool so that a series of cuts may be formed in a workpiece supported in the lathe regularly spaced in a direction parallel to the centerline of the lathe by feeding the first cutting tool supported in the tool holder into cutting engagement with the workpiece to form a reference cut and then moving the tool holder parallel to the centerline of the lathe until the locator is engagable with the reference cut thereby locating the first cutting tool for a successive cut in the workpiece at the selected distance from the reference cut.

5. The invention as defined in claim 4, including a fourth arm, means connecting one end of the fourth arm to the tool holder so that the fourth arm is swingable in a plane generally parallel to the motion of the second arm and means joining the third arm to the opposite end of the fourth arm so that the locator member is swingable about the pivot axis of the fourth arm toward and away from a locating position.

6. In a lathe, the combination comprising: a body member; a first cutting tool; means mounting said first cutting tool on said body member in a cutting position in which cutting portions of the tool extend beyond the body; a support member; means connecting said support member to said body member for motion between first and second positions; a second cutting tool; first means on said support member for mounting the second cutting tool; second means on said support member engagable with the first cutting tool when the support member is in its first position to assist in locating the cutting position of the second cutting tool with respect to the first cutting tool, said second means being separated from the first cutting tool by motion of the support member toward its second position.

7. The invention as defined in claim 6, wherein the support member comprises an arm having an inner end pivotally connected to the body member so that its outer end is swingable toward and away from the extended portions of the first cutting tool, and wherein the second means comprises a member on the outer end of the arm engagable with the upper edge of the first cutting tool at a position below the second cutting tool so that the second cutting tool is supported by the first cutting tool.

* * * * *